United States Patent Office 2,697,866
Patented Dec. 28, 1954

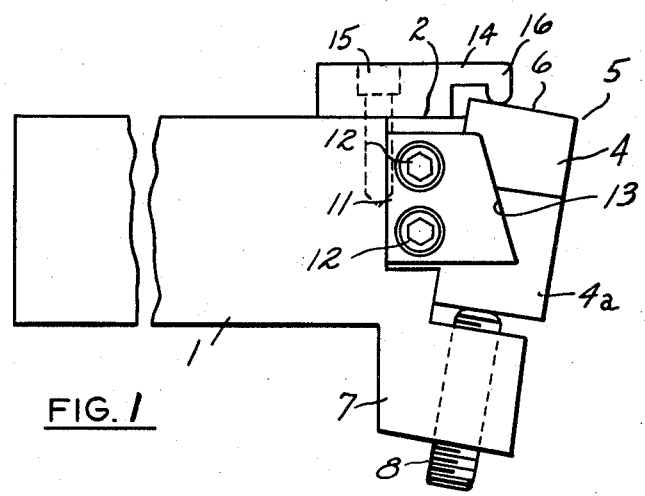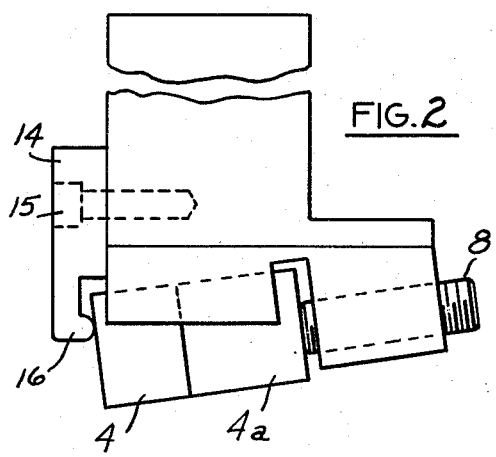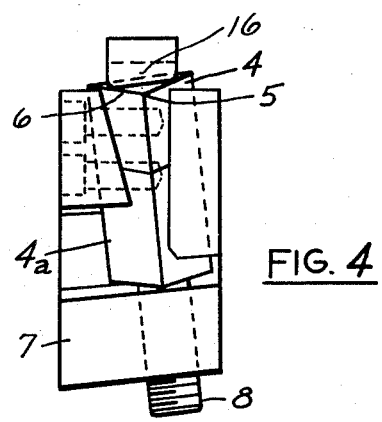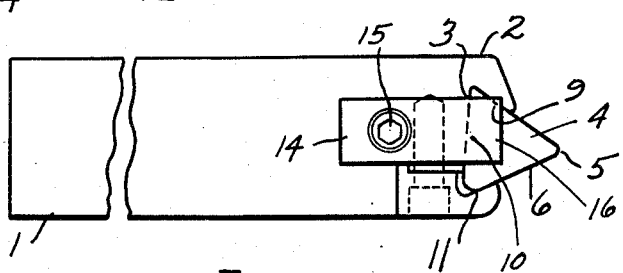

2,697,866

CUTTING TOOL

Walter J. Greenleaf, Meadville, Pa.

Application June 22, 1953, Serial No. 363,331

4 Claims. (Cl. 29—96)

This invention is intended to provide a cartridge-type tool holder for hard metal cutting bits such as cemented carbides of the type in which short lengths of bit can be used. The bit is received in a socket open at one side and is clamped endwise between a stop engaging the top of the bit and a longitudinally adjustable support engaging the bottom of the bit. The bit is clamped laterally by a clamp extending along the open side of the socket opposite the bit and exerting a lateral clamping pressure forcing the bit against the closed side of the socket. With this arrangement, the bit is clamped both laterally and endwise so rocking of short lengths is prevented. The lateral clamp extends up along the bit close to the end cutting surface thereby providing a firm support adjacent the cutting surface.

In the accompanying drawing, Fig. 1 is a side view of a tool holder; Fig. 2 is a view from the opposite side; Fig. 3 is a top plan view; and Fig. 4 is an end view.

The invention is shown applied to the cutting tool having a holder with a shank 1 and a head 2 provided with a socket 3 extending transverse to the shank and receiving an elongated cutting bit 4 and support or anvil 4a of the same cross-section. The support does not have to be of the same cross-section as the bit 4, it merely being necessary that the bottom of the bit have a bottom support, which, in conjunction with the other structure, will keep a short or thin bit from tipping or tilting under cutting pressure. The cutting bit 4 is ground flat across the upper and lower ends and the front end of the bit projects above the head 2 so as to present an end cutting edge 5 and a side cutting edge 6. The anvil 4a is also ground flat across its upper and lower ends. The bit may be cemented carbide. The anvil may be made of hard-seating material such as carbide, stellite, or high-speed steel. As shown in Figs. 1 and 4, the socket 3 is inclined inward from the side cutting edge 6 and backward from the end cutting edge 5 to provide cutting clearance for the cutting edges. Because the cutting edges are unobstructed, the clearance angle can be as small as desired. The socket 3 terminates above the bottom of the head 2 and in the solid lower end 7 of the head is threaded an adjusting and back-up screw 8 which engages the lower end of the anvil 4a and holds the anvil against the bottom of the bit 4 to take the vertical component of the cutting thrust. If the anvil 4a is omitted, the screw 8 will engage the bottom of the bit and serve as a bottom support. The anvil 4a urges the bit up against a hold-down member or stop 14 secured to the holder 1 by a set screw 15 and having its front end 16 engaging the upper end of the bit thereby clamping the bit between the anvil and stop 14 and preventing tilting of the bit. The stop 14 also determines the vertical height of the cutting edges 5 and 6 with respect to the top of the head 2.

In the specific form illustrated, which is designed to take a bit of triangular cross-section, the socket 3 is of angular section formed by the intersection of the surface 9 at the front of the body 2 of the holder and a surface 10 at the back of the body. The socket can be shaped for other bits such as round or square bits. The side of the socket adjacent the cutting edge 6 is open. Extending part way out over the open side of the socket 3 is a clamping member 11 fastened to the body 2 of the holder by screws 12 and engaging the rear portion of the cutting edge 6 and the corresponding portion of the anvil 4a and exerting a lateral clamping pressure both on the bit and the anvil clamping the bit and anvil against the closed side of the socket formed by the intersection of the surfaces 9 and 10. The clamping member 11 extends up along the bit close to the upper end of the bit so that the lateral clamping pressure is exerted close to the upper end of the bit having the cutting surfaces 5 and 6. As shown more clearly in Fig. 1, the clamping member is cut away as indicated at 13 so that at the upper end of the bit, the clamping member 11 offers a minimum of obstruction to the cutting edge 6 thereby permitting a greater depth of cut. The clamping member 11 need not be made in a single piece as shown. The same lateral clamping effect would be obtained, if there were two separate pieces, one clamping the bit 4 and the other clamping the anvil 4a.

From one aspect, the bit is clamped endwise between the anvil 4a or the screw 8 and the hold-down member 14 and the bit is also clamped laterally into the socket by the clamp 11 thereby providing an exceptionally firm support for the bit which is desirable for short lengths. The endwise clamping of the bit is particularly effective in preventing tipping or tilting of the bit under cutting thrust. In the specific holder illustrated, the anvil 4a is also clamped laterally into the socket by the clamp 11.

The firmness of support of the bit is increased by the fact that the clamping force of the member 11 wedges the bit and anvil into the angular socket 3 formed by the intersection of the surfaces 9 and 10.

Because carbide bits are subject to heat checking, which frequently splits the bits in a lengthwise direction, the shorter bits for which the present holder is designed are more economical in that the length of bit which can be ruined by heat checking is much less. Also, those who have used holders designed for the longer bits will invariably have on hand many pieces too short for the other holders which can be used in the present holder.

As is customary, the bit may be rotated in the holder and turned end-for-end so as to bring each side to the cutting position before regrinding.

What is claimed as new is:

1. In a cutting tool having a body for attachment to a machine tool and a head for carrying a bit, said head having a socket therein with its longitudinal axis extending in the general direction of the cutting thrust, the socket being open at one side, a cutting bit fitting lengthwise in the socket having its upper end ground transverse to the length of the bit to provide a cutting edge at the front of the head, lateral clamping means fastened to the head and extending out over the open side of the socket and up along the bit close to the upper end of the bit and exerting a lateral clamping pressure on the bit clamping the bit against the closed side of the socket, and endwise clamping means fastened to the head and exerting a clamping pressure on the ends of the bit, said endwise clamping means including a hold-down member on the holder engaging the upper end of the bit and a support engaging the lower end of the bit.

2. In a cutting tool having a body for attachment to a machine tool and a head for carrying a bit, said head having a socket therein with its longitudinal axis extending in the general direction of the cutting thrust, the socket being open at one side, a cutting bit fitting lengthwise in the socket having its upper end ground transverse to the length of the bit to provide a cutting edge at the front of the head, an anvil fitting lengthwise in the socket and having its upper end engaging the lower end of the bit, lateral clamping means fastened to the head and extending out over the open side of the socket and up along the bit close to the upper end of the bit and exerting a lateral clamping pressure on the bit and on the anvil clamping the bit and the anvil against the closed side of the socket, a hold-down member on the holder engaging the upper end of the bit clear of the cutting edge, and supporting means on the holder engaging the anvil to take the endwise cutting thrust and cooperating with the hold-down member to exert an endwise clamping pressure on the bit.

3. In a cutting tool having a body for attachment to a machine tool and a head for carrying a bit, said head having a socket therein with its longitudinal axis extending in the general direction of the cutting thrust, the socket being open at one side, a cutting bit fitting lengthwise in the socket having its upper end ground transverse to the length of the bit to provide a cutting edge at the front of the head, an anvil fitting lengthwise in the socket and having its upper end engaging the lower end of the bit, lateral clamping means fastened to the head and extending out over the open side of the socket over the upper end of the anvil and up along the bit close to the upper end of the bit and exerting a lateral clamping pressure on both the anvil and the bit clamping the bit and anvil against the closed side of the socket, a hold-down member on the holder engaging the upper end of the bit, clear of the cutting edge, and an adjusting screw on the holder engaging the lower end of the anvil and moving the anvil axially along the socket and cooperating with the anvil and hold-down member to exert an endwise clamping pressure on the bit.

4. In a cutting tool having a body for attachment to a machine tool and a head for carrying a triangular bit, said head having an angular socket having two intersecting side walls, one of the side walls being at the back of the head and the other side walls extending toward the front of the head, said socket being open at the side opposite the side walls and having its longitudinal axis extending in the general direction of the cutting thrust, a triangular bit fitting lengthwise in the socket having its upper end ground transverse to the length of the bit to provide a cutting edge at the front of the head, a triangular anvil fitting lengthwise in the socket and having its upper end seated against the lower end of the bit, clamping means fastened to the head and extending out over the open side of the socket over the upper end of the anvil and up along the bit close to the upper end of the bit and exerting a lateral clamping pressure on both the anvil and the bit wedging the bit and anvil against the angularly intersecting side walls of the socket, a hold-down member on the holder engaging the upper end of the bit clear of the cutting edge, and supporting means on the holder engaging the lower end of the anvil to take the endwise cutting thrust and cooperating with the anvil and hold-down member to exert an endwise clamping pressure on the bit.

No references cited.